Patented Feb. 18, 1947

2,415,946

UNITED STATES PATENT OFFICE 2,415,946

METHOD OF MAKING BORON

Worth C. Goss, Seattle, Wash.

No Drawing. Application October 19, 1942,
Serial No. 462,489

1 Claim. (Cl. 23—209)

The principal object of my invention is the production of pure amorphous elemental boron by an improved process which is simple to practise, and by means of which boron may be produced cheaply.

A second object of my invention is the production of sodium hydroxide as a by-product of the manufacture of boron of the proper quality to be used as an ingredient of high explosives.

Another object is the production of hydrochloric acid as a by-product of boron manufacture.

A still further object of the invention is the elimination of the need to purify the amorphous boron produced as is necessary in any method disclosed up to this time. See Patent No. 997,879, issued July 11, 1911, to Weintraub, and applicant's co-pending application for patent, Serial No. 462,488, filed October 19, 1942, entitled Sodium method of making boron.

Boron produced in the usual manner by reduction of boron oxide with metallic magnesium results in a very impure product which may be partially purified by repeated acid washes. However, boron itself has very great adsorbent properties and any impurity mixed with the boron is so difficult to eliminate that the present market value of pure amorphous boron is $450 per pound. Even a water soluble substance mixed with boron is very difficult to eliminate due to the adsorptivity of amorphous boron. Also, during purification, tetra-boron pentoxide or boron suboxide is likely to be formed which makes boron of little value as an explosive ingredient. It will therefore be realized that the present process which produces an amorphous product free of impurity is a distinct step in advance of prior work. It must be realized that boron for explosives should be finely powdered and amorphous.

The present process uses as raw material, sodium chloride, sodium tetraborate, and powdered charcoal. The first step of the process is the electrolysis of the salt:

The sodium hydroxide produced is a primary by-product of the process and is salable as such. The chlorine is used in the second step of the process:

The foregoing reaction is carried out in an electric furnace that preferably uses alternating current. The anhydrous borax is mixed with calcined powdered charcoal and the mix is melted over a gas flame and fed to the furnace in a molten condition. The reaction absorbs a small amount of heat which may be supplied electrically. The gaseous chlorine is fed into the bottom of the furnace and through the molten sodium tetraborate, thus stirring the charcoal and preventing it from settling to the bottom of the furnace. The fused borax, carbon and the chlorine react at a bright red heat to give boron tri-chloride and carbon monoxide, thus converting the sodium tetraborate to sodium chloride and the two gaseous products which leave the furnace. The boron tri-chloride is condensed in a suitable condenser at about 5° C. and is then drained off and fed to distillation equipment where it is re-distilled. The carbon monoxide is led back to the furnace feed and burned there to melt the sodium tetraborate being fed to the furnace.

If desired, calcium tetraborate may be used instead of sodium tetraborate.

The third step of the process is the production of amorphous boron by the reduction of boron tri-chloride with the hydrogen produced in the first step of this process. U. S. Patent No. 1,074,672 to Weintraub discloses reduction of boron chloride with hydrogen by means of an electric arc, but Weintraub's object is to produce non-amorphous boron, and the effect of the high temperature arc is to produce a considerable proportion of non-amorphous boron. The present method accomplishes the reduction by means of an electric furnace in which boron is deposited as a result of catalytic contact. The furnace employed is of the rotary electric type, somewhat similar to the furnace described in my copending U. S. application for patent, Serial No. 462,491, filed October 19, 1942, entitled Carbon activator. The axis of the furnace is horizontal and heating is accomplished by the passage of alternating current through powdered boron lying in the tubular retort. Lifts are arranged longitudinally inside the furnace to keep the hydrogen atmosphere filled with boron dust. Boron chloride and hydrogen are passed into the upper end of the furnace according to the chemical equation:

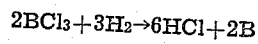

The boron dust suspended in the furnace atmosphere acts as a contact agent to cause precipitation of boron from the boron chloride. The reaction proceeds at a low white heat and the amorphous boron powder discharges from the lower end of the retort, where it is cooled in a stream of cold hydrogen gas. The boron produced in this manner may be freed of any adsorbed HCl by washing in water and drying. This apparatus is adapted to large scale production of boron in an amorphous form and as a by-product large volumes of hydrochloric acid are made by absorbing the HCl gas in water.

Amorphous elemental boron as thus produced may be wet impregnated with ammonium nitrate, dried, crushed, and mixed with TNT to give a special form of the military explosive amatol, and which, when properly prepared will be found to be approximately 40% more powerful in its explosive action than TNT. I have named this explosive Boronite. This material depends for good chemical stability on properly prepared boron, as the presence of certain impurities results in an unstable explosive.

Having thus described my invention, what I claim as new therein and desire to secure by Letters Patent is:

The method of making powdered elemental boron comprising introducing gaseous boron chloride and hydrogen into an electric furnace into a gaseous suspension of powdered boron previously formed, reducing the boron chloride while maintaining the temperature below the melting point of boron, and agitating the previously formed boron to produce powdered elemental boron, and recovering the boron.

WORTH C. GOSS.

REFERENCES CITED

The following references are of record in the file of this patent:

UNITED STATES PATENTS

| Number | Name | Date |
| --- | --- | --- |
| 1,019,569 | Weintraub | Mar. 5, 1912 |
| 1,074,672 | Weintraub | Oct. 7, 1913 |

OTHER REFERENCES

"Course in General Chemistry," McPherson and Henderson, published by Ginn & Co., 1927, page 415.